Aug. 25, 1936.  V. MONROE  2,051,998
DRIVE CLAMP
Filed May 8, 1935
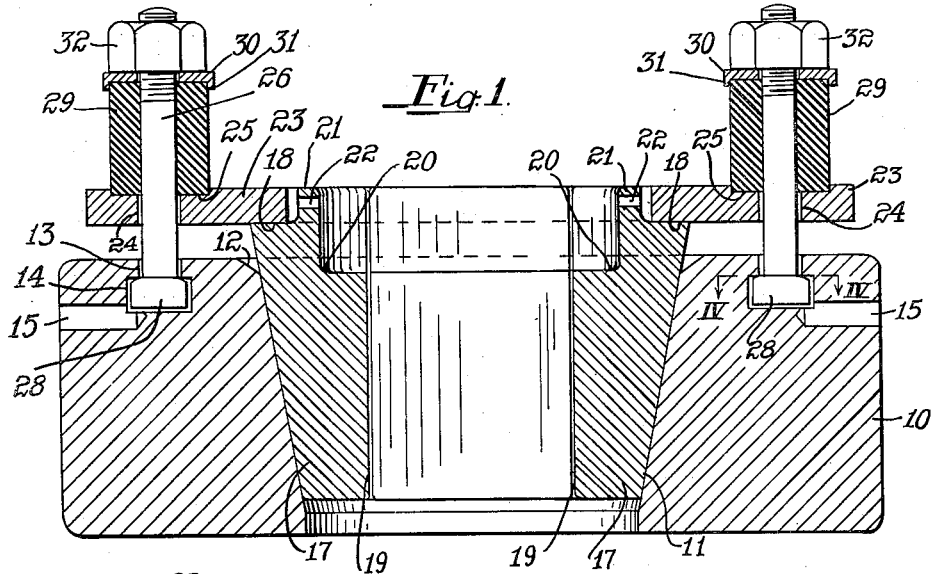
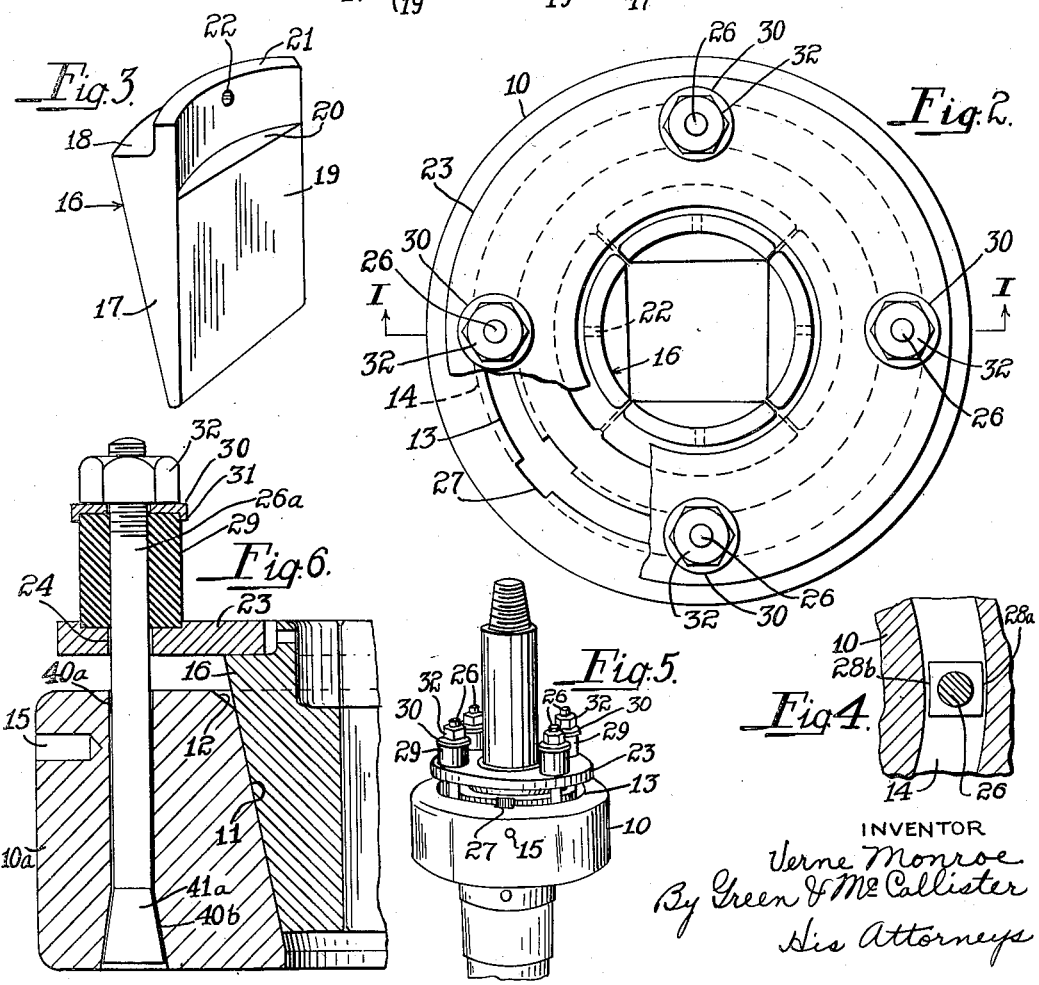
INVENTOR
Verne Monroe
By Green & McCallister
His Attorneys Patented Aug. 25, 1936

2,051,998

UNITED STATES PATENT OFFICE 2,051,998

DRIVE CLAMP

Verne Monroe, Cameron, W. Va.

Application May 8, 1935, Serial No. 20,353

6 Claims. (Cl. 255—1)

The subject matter of my present invention is a drive clamp or drive ring which is used to drive casings and the like into well holes in the drilling of oil and gas wells. The present invention constitutes an improvement upon the construction disclosed in Patent No. 1,790,388, granted January 27, 1931 to myself and R. L. Fletcher jointly.

The general state of the art and the disadvantages inherent or latent in prior art structures are pointed out in the specification of the patent just referred to and hence require no repetition here. I have now discovered, however, that the construction of Patent No. 1,790,388 also has certain disadvantages. For example, the ears of the slips, being subject to considerable stresses and strains, were too prone to break off, particularly in a construction of this kind wherein sudden shocks of considerable magnitude had to be resisted. Again, water collected in the undercut groove and being entrapped therein caused corrosion and obstructed movement of the bolts in the groove. The bolts themselves were subject to breakage thus causing delay and expense. Certain other disadvantages lay in the use of springs which eventually lost their resiliency, broke or became permanently compressed thus producing the effect of a rigid metal sleeve. The use of castellated nuts proved to be a disadvantage at times since the nuts were thereby weakened.

One of the objects of my present invention is to obviate defects and disadvantages such as those indicated above and to provide a drive clamp which has advantages peculiar to its own construction.

Another object of my invention resides in eliminating the ears of the slips as well as the springs hitherto used and in overcoming the accumulation of water or other liquid material in the groove.

A still further object resides in so mounting the bolts that bolt breakage is eliminated and hence repair and replacement minimized.

Other and further objects will be appreciated by those skilled in this art such as that the drive clamp of the present invention may be attached to any part of the drilling or drive stem and will catch and firmly hold either a two- or four-square pin or any part of the round body of the stem.

Still other objects and advantages will be understood from what follows.

In the accompanying drawing I have illustrated my improved drive clamp construction wherein:—

Figure 1 is a vertical section taken on line I—I of Fig. 2;

Fig. 2 is a plan view of my improved drive clamp;

Fig. 3 is a view in perspective of a new type of slip forming a part of the present invention;

Fig. 4 is a section of a detail taken on line IV—IV of Fig. 1;

Fig. 5 is a perspective view on a reduced scale of the present drive clamp in readiness for use; and Fig. 6 is a fragmentary section corresponding to the lefthand side of Fig. 1, but showing a modified bolt and bolt mounting.

Like numerals designate corresponding parts in the various views.

Referring now to the drawing the numeral 10 designates a heavy solid metal ring of the same general nature as that described in aforementioned Patent 1,790,388. The ring 10 is provided with a central tapered bore or aperture 11 which becomes reduced in size from top to bottom and the inner upper edge of the ring is preferably beveled or rounded as indicated by the numeral 12. The upper surface of the ring 10 is provided with an annular groove, the lower part 14 of which is wider than the upper part 13, so that the groove is in effect undercut and is so termed hereinafter.

Spaced around the ring 10 are a plurality of recesses 15 by means of which the ring can be conveniently lifted by tongs or other suitable tools. As shown in Fig. 1, the recesses 15 intersect or communicate with the undercut portion 14 of the groove whereby water or other liquid in the groove will drain therefrom. Any suitable number of recesses 15 may be provided, a common number being four, but I am not, of course, limited to any particular number and I may have two, four, six or any other suitable number.

In contradistinction to the slips shown in the patent referred to, the slip 16 of the present construction is made as shown in Fig. 3. Inasmuch as each slip is identically configured and constructed a description of one will suffice for all. Each slip is constructed with a wedge-shaped metal body portion 17 which tapers from top to bottom. The outer surface of each slip, that is, the surface contacting with the inside of ring 10 is shaped somewhat convexly so as to conform to the said ring surface.

Near the top of the outer surface of each slip, material is cut away to provide a horizontal shoulder 18 which, of course, is also arcuate. The inner surface of each slip, that is, the surface 19 which contacts the stem when in use is planar from the bottom to a point near the top whereat the material is cut away to provide an inner ledge 20 which is lower than the shoulder 18 just described. The balance of the slip is an arcuate projecting ridge 21 which is concavo-convex and provided with a transverse hole 22 by means of which it may be lifted or held by a wire or the like. Four of these slips are utilized as will be understood from Fig. 2 and from Patent No. 1,790,388 and they are arranged around the inside of the ring to form a clamping or gripping means for a stem. The position of these slips with respect to the ring will be clearly understood from Fig. 1.

A metal annulus 23 is so assembled with relation to the slips and ring 10 that the annulus rests upon the shoulders 18 and overlies the ring 10. At spaced points the annulus 23 is provided with holes 24 therethrough and these holes are vertically aligned with the groove 13, above mentioned. Each hole 24 is provided with a countersunk portion 25. The number of holes in annulus 23 depends, of course, upon the number of bolts to be used in any given installation, the usual number of which is either four or six. I am not limited to any particular number but have shown four in Figs. 2 and 5 for exemplary purposes.

A number of bolts 26 are assembled in groove 13, 14 by way of a groove enlargement 27 (Fig. 2) formed in the groove as is shown in Figs. 2 and 5. These bolts have enlarged heads 28, the outer and inner surfaces 28a, 28b being contoured to fit the curvature of the groove. These heads are larger than the upper portion 13 of the groove but are of such a size as to be movable in the undercut portion 14 of the groove and hence must be positioned via enlargement 27. The annulus 23 is positioned as shown so that the bolt shanks project through the holes 24 in the annulus and upon each bolt shank is placed a rubber sleeve or cylinder 29 which fits into the countersunk portion 25 in the upper surface of the annulus 23 and hence eliminates the necessity of using a lower washer. Upon each rubber sleeve or cylinder is placed a cap-shaped washer 30 having a flange 31 and, superjacently, a nut 32 which is tightened to the desired degree, thus holding the assemblage of parts in place. It is to be noted that nuts 32 need not be castellated as was the case in Patent 1,790,388 and hence the construction, even in this detail, is materially stronger.

In Fig. 6, I have shown a modified form of the invention. In this modification, a number of holes 40a are cut all the way through the ring member 10a. Each one of these holes is, for a major part of its extent, of such a size as comfortably to receive the long bolt shanks 26a. The balance of each hole 40b is frusto-conical, being tapered from the bottom to a point where it meets the hole 40a just described and each bolt 26a is provided with a frusto-conical head 41a which cooperates therewith as shown. In certain instances I have found that this construction is better, stronger and simpler and I accordingly deem it to be a part of my present invention. The use and operation of the present clamp will be clearly understood from Patent 1,790,388 and hence is not repeated here. The present disclosure, is, however, intended more in an illustrative than in a limitative sense and I reserve the right to make additions, omissions, variations and substitutions so long as I do not depart from the principle scope or wording of the invention herein described and claimed.

What I claim as new and desire to secure by Letters Patent is:

1. A drive clamp comprising a heavy metal ring having a tapered central bore and an undercut groove on its upper surface, a plurality of wedge-shaped slips in said bore each of which is provided with a shoulder, an annulus resting on said shoulders, and means for resiliently holding the annulus in position, said ring having spaced recesses, communicating with said undercut groove for handling the ring by means of a suitable tool and for keeping said groove free from liquid.

2. In a drive clamp, a heavy metal ring having an undercut groove on its upper surface and spaced recesses communicating with said groove.

3. A slip comprising a wedge-shaped body of metal one surface of which is convex and provided with an arcuate concentric shoulder near but below the top of the slip and another surface of which has a planar face terminating in a ledge which is at a lower vertical level than the arcuate shoulder aforesaid.

4. A drive clamp comprising a heavy metal ring provided with a central bore which tapers from top to bottom and an annular undercut groove in its upper surface, a plurality of slips in said bore together adapted to grip a stem, each such slip having an arcuate shoulder on the outer surface thereof near but below the top of the slip, the arcuate shoulders together forming an annular shoulder, a metal annulus resting on the annular shoulder and overlying the undercut groove, bolts extending up out of the undercut groove and passing through holes provided in the annulus for such purpose and means, including a resilient non-metallic element, for resiliently maintaining the elements aforesaid in operative association.

5. A drive clamp comprising a heavy metal ring provided with a central bore which tapers from top to bottom and an annular undercut groove in its upper surface, a plurality of slips in said bore together adapted to grip a stem, each such slip having an arcuate shoulder on the outer surface thereof near but below the top of the slip, the arcuate shoulders together forming an annular shoulder, a metal annulus resting on the annular shoulder and overlying the undercut groove, bolts extending up out of the undercut groove and passing through holes provided in the annulus for such purpose and means, including a resilient non-metallic element, for resiliently maintaining the elements aforesaid in operative association, the top surface of the annulus being flush with the top of the slips.

6. In a drive clamp or the like, a slip having a wedge-shaped body portion tapering from top to bottom, the outer surface thereof being convex, an arcuate shoulder formed in the convex side of the slip below but near the top thereof, the inner side of the slip having a planar face terminating in a horizontal ledge situated lower than the arcuate shoulder on the outer surface, both surfaces terminating in a concavo-convex projecting ridge.

VERNE MONROE.